US010967409B2

(12) United States Patent
Kipping et al.

(10) Patent No.: US 10,967,409 B2
(45) Date of Patent: Apr. 6, 2021

(54) DEVICE AND METHOD FOR COOLING A ROLL

(71) Applicant: SMS Group GmbH, Duesseldorf (DE)

(72) Inventors: Matthias Kipping, Herdorf (DE); Johannes Alken, Siegen (DE); Ralf Seidel, Dillenburg (DE); Torsten Mueller, Kreuztal (DE); Magnus Treude, Hilchenbach (DE)

(73) Assignee: SMS GROUP GMBH, Duesseldorf (DE)

( * ) Notice: Subject to any disclaimer, the term of this patent is extended or adjusted under 35 U.S.C. 154(b) by 468 days.

(21) Appl. No.: 15/531,014

(22) PCT Filed: Nov. 26, 2015

(86) PCT No.: PCT/EP2015/077843
§ 371 (c)(1),
(2) Date: May 26, 2017

(87) PCT Pub. No.: WO2016/083546
PCT Pub. Date: Jun. 2, 2016

(65) Prior Publication Data
US 2018/0009016 A1    Jan. 11, 2018

(30) Foreign Application Priority Data
Nov. 27, 2014  (DE) .................... 102014224318.1

(51) Int. Cl.
*B21B 27/10*  (2006.01)
*B21B 38/02*  (2006.01)
*G01B 3/12*  (2006.01)

(52) U.S. Cl.
CPC .............. *B21B 27/10* (2013.01); *B21B 38/02* (2013.01); *G01B 3/12* (2013.01); *B21B 2027/103* (2013.01)

(58) Field of Classification Search
CPC ... B21B 27/10; B21B 27/06; B21B 2027/103; B21B 28/00; B21B 37/32; B21B 15/005
See application file for complete search history.

(56) References Cited

U.S. PATENT DOCUMENTS 4,741,193 A    5/1988  Kimura
5,212,975 A *  5/1993  Ginzburg ................ B21B 27/10
                                                239/562

(Continued)

FOREIGN PATENT DOCUMENTS

DE         5847502      3/1983
DE       102011104735   12/2012

(Continued)

OTHER PUBLICATIONS

Machine translation of SU1069892A, Isirov et al., pp. 1-3, translated on Aug. 14, 2019 (Year: 2019).*

*Primary Examiner* — Teresa M Ekiert
(74) *Attorney, Agent, or Firm* — Abelman, Frayne & Schwab

(57) ABSTRACT

The invention relates to a device and a method for cooling a roll. The roll concerned can be a roller in a roll stand or a measuring roll. The device comprises a cooling shell having a cross section in the shape of a section of a circular arc, for covering a surface region of the roll (200), wherein, in the region of an edge of the cooling shell, a bearing is formed with a pivot joint (120) with an axis of rotation running perpendicular to the circular arc-shaped cross-section, for pivoting the cooling shell about the axis of rotation. According to the invention, in order to ensure that the size of the cooling gap during the rolling operation or during the operation of a measuring roll is always autonomously optimally set, the bearing has a degree of freedom in radial direction r with respect to the circular arc-shaped cross- (Continued)

section of the cooling shell, such that the cooling shell is mounted in the bearing in such a way as to be freely movable in the radial direction.

19 Claims, 4 Drawing Sheets

(56) References Cited

U.S. PATENT DOCUMENTS

| | | | | |
|---|---|---|---|---|
| 5,553,469 | A * | 9/1996 | Seidel | B21B 37/32 |
| | | | | 72/13.4 |
| 5,715,720 | A * | 2/1998 | Balve | B21B 13/02 |
| | | | | 72/239 |
| 6,385,989 | B1 * | 5/2002 | Cassidy | B21B 27/10 |
| | | | | 62/373 |
| 6,782,726 | B2 | 8/2004 | Armenat | |
| 9,108,235 | B2 * | 8/2015 | Kipping | B21B 27/10 |
| 9,254,513 | B2 | 2/2016 | Pawelski | |
| 9,610,622 | B2 | 4/2017 | Alken | |
| 2002/0134146 | A1 * | 9/2002 | Grefve | B21B 38/02 |
| | | | | 73/104 |
| 2012/0031159 | A1 | 2/2012 | Seidel | |
| 2014/0060135 | A1 | 3/2014 | Pawelski | |
| 2015/0135792 | A1 | 5/2015 | Kipping | |

FOREIGN PATENT DOCUMENTS

| | | | | |
|---|---|---|---|---|
| JP | 5939409 | | 3/1984 | |
| JP | 59162106 | U | 10/1984 | |
| JP | 6245409 | | 2/1987 | |
| JP | 63303609 | | 12/1988 | |
| SU | 1069892 | A1 * | 1/1984 | B21B 27/10 |

* cited by examiner

DEVICE AND METHOD FOR COOLING A ROLL

RELATED APPLICATIONS

This application is a National stage application of International Application PCT/EP2015/077843 filed Nov. 26, 2015, designating the U.S.A., and claiming priority of German application DE 10 2014 224 318.1 filed Nov. 27, 2014, both applications are incorporated herein by reference thereto.

BACKGROUND OF THE INVENTION

1. Field of the Invention

The invention concerns a device and a method for cooling a roll. The roll can be a roller in a rolling stand for the rolling of typically metallic rolled product or a measuring roller. The cooling of the roll occurs by using a cooling shell mounted on the roll. The invention furthermore concerns a rolling stand and a measurement device with such a device.

2. Description of the Prior Art

Devices for the cooling of a roll by using a cooling shell are basically known in the prior art, for example from the documents JP 63303609 A, DE 3616070 C2, DE 20 2010 202 340 A1, DE 10 2012 219 722 A1 and DE 10 2012 216 570 A1. The first two cited publications disclose a cooling device with a cooling shell to realize a forced convection for the cooling of the roll. What is common to all cited publications is that each time there is provided a fixed positioning of a cooling shell relative to the particular roll being cooled and thus a fixed adjustment of the size of a cooling gap between the cooling shell and the surface of the roll being cooled for the passage of a cooling agent. However, in order to achieve an optimal cooling it is important for the height or size of the cooling gap to be adapted to unchanged surrounding or process conditions. Thus, the rolls during their lifetime are repeatedly regrinded, while each grinding of the roll typically requires a readjustment of the cooling gap. The adjustments needed for this in the cooling devices or screw-down devices for the cooling shells known in the prior art are undertaken manually or semiautomatically by using set screws in the prior art. These adjustments must be done outside of the rolling stand, since this is not possible in the rolling stand for reasons of time, space, and danger. Likewise, it seems doubtful that the mentioned manual adjustments of the gap height could even be done with the requisite precision in the rolling stand.

Moreover, it should be noted that the cooling shells described in the prior art are connected to the roll chocks, i.e., fastened to the bearing blocks of the rolls. This means that each roll must be outfitted with such a cooling shell and the corresponding screw-down mechanism. Therefore, for the grinding of the roll, both the roll itself and the chocks and cooling shells mounted thereon need to be dismounted and then put back in place and manually adjusted. Since in practical rolling mill operations a first roll set is always installed in the rolling stands whenever possible, while at least a second roll set is kept on hand in the roll workshop, typically twice as many cooling shells with their corresponding screw-down devices are kept on hand as rolls needed for the rolling operation in a production line.

Another drawback of the cooling devices known in the prior art, i.e., the cooling shells and their screw-down devices, is that their mounting on the chocks of the rolls on the one hand makes the weight distribution uneven between the inlet and the outlet of the rolled product in a rolling stand and on the other hand the rigidity of the overall system is further increased for a bending about the axis of rotation of the roll, both effects have a negative impact on the roll bending. This is detrimental to the friction and regulating behavior of the rolls. If the cooling medium at the end of the cooling gap between the cooling shell and the roll being cooled cannot drain out freely or without impediment, this is detrimental to the cooling action. It can be shown by simulations that the cooling medium would then develop unwanted turbulent cross flows at the drainage end of the cooling gap, resulting in a non-uniform cooling and thus a non-uniform wear of the rolls across the breadth of the rolls. The resulting diameter differences across the breadth of the roll could no longer be balanced out or remedied, so that the roll would then produce an unwanted profile in the rolled product, which would detract from the quality of the rolled product.

SUMMARY OF THE INVENTION

The problem which the invention proposes to solve is to modify a known device and a known method for cooling a roll as well as a known rolling stand and a known measurement device with such a device so that the size of the cooling gap, i.e., the radial spacing between the cooling shell and the surface of the roll being cooled is always automatically adjusted optimally during the operation of the device.

This problem is solved in regard to the device by the subject matter as set forth in the claims. This is characterized in that the single bearing has a degree of freedom in the radial direction with respect to the circular arc-shaped cross section of the cooling shell, so that the cooling shell is mounted in the bearing in such a way as to be freely movable in the radial direction.

The term "roll" in the context of the present invention means, for example, a roller in a roiling stand for the rolling of rolled product or a measuring roller in a processing system for rolled product. The measuring roller typically serves for detecting a pressure or planarity distribution across the breadth of the rolled product when this product partly wraps around the measuring roller.

The single bearing may consist of several partial bearings, especially two halves, all of which have the same axis of rotation.

The bearing can be designed as a spherical bearing in order to guarantee a parallelness of pivot axis of the cooling shell and roll axis and thus the functional performance of the device even in event of a skewing of the roll.

The claimed free mobility of the cooling shell in the radial direction advantageously ensures that the size or height of the cooling gap between the inside of the cooling shell and the surface of the roll during rolling operation is automatically adjusted properly in dependence on the volume flow or the pressure with which the cooling medium is introduced into the cooling gap in an automatic or spontaneous manner according to a free play of the forces. On the one hand, this is optimal in terms of the cooling action achieved, because the free adjustment of the height of the cooling gap means in particular that no unwanted turbulence occurs in the flow of the cooling medium in the cooling gap. Moreover, the free radial mobility makes it unnecessary to provide costly screw-down devices for the manual or automatic radial screw-down of the cooling shells. With the elimination of these screw-down devices, the associated problems in the prior art in regard to the space requirement, the time needed for the adjustment or screw-down, and the danger to the workers associated with the adjustment also go away. Furthermore, the accuracy of the adjustment of the size of the cooling gap is no longer in doubt, since because of the free play of forces the size or height of the cooling gap is automatically or spontaneously optimal at all times during the rolling operation.

According to a first sample embodiment of the invention, the cooling shell is hung free swinging from the single pivot joint. The free swinging suspension of the cooling shell, just like its free mobility in the radial direction, also serves for the force-guidance of the cooling medium in the cooling gap only in the circumferential direction but not in the radial direction. In particular, as noted, the degree of freedom in the radial direction prevents the occurrence of unwanted turbulent cross flows at the entrance and exit of the cooling gap and accordingly ensures an always uniform and identically directed flow, so that a uniform optimal cooling is also achieved. The uniform cooling goes hand in hand with an advantageous uniform wearing of the rolls—when the roll is used in a rolling stand—as well as a uniform high quality of the rolled product.

According to another sample embodiment, a ballast weight is mounted on the convex curved outside of the cooling shell—optionally also at a spacing from the outside of the cooling shell by means of a lever arm. Through suitable dimensioning and distribution of the weights on the outside of the cooling shell in the circumferential direction and through a suitable length adjustment and orientation of the lever arms of the ballast weights in regard to the axis of rotation of the pivot joint, a desired torque can be adjusted, which is produced upon swiveling of the cooling shell about the axis of rotation of the pivot joint in regard to a pendulum position of rest. The term "pendulum position of rest" means that position or situation which the cooling shell with the ballast weights would adopt if it were subject only to the force of gravity—or free swinging. The torque represents a particular area loading, which acts on the cooling agent in the cooling gap. A desired cooling performance can be adjusted as desired by providing a particular area load in dependence on the given pressure or volume flow of the cooling medium in the cooling gap.

It is important to note in this place that the ballast weights provided are merely optional and in no way mandatory. The cooling shell itself has its own mass distribution, which is established already during the fabrication of the cooling shell. Alternatively to the providing of the additional ballast weights, the mass distribution of the cooling shell itself can also be formed suitably already during its fabrication in regard to a torque which is desired in a later application.

The device according to the invention has a positioning mechanism, which engages with the bearing for the positioning of the bearing with the cooling shell mounted thereon in a predetermined position, typically a predetermined angle position $\alpha$ on the circumference of the roll being cooled. The angle position on the circumference of the roll being cooled can basically be chosen anywhere between $0°<\alpha<360°$. The angle position $\alpha$ also has influence on the size of the deflection of the cooling shell from the pendulum position of rest and thus the magnitude of the torque and the magnitude of the area loading acting on the cooling medium during rolling operation. The larger the deflection, the larger the torque and the area load, and vice versa.

The aforementioned problem of the invention is furthermore solved by a rolling stand and by a measurement device in accordance with the claims. The rolling stand has at least one roll in the form of a roller for the rolling of rolled product and the device of the invention according to one of the aforementioned claims. The measurement device has a roll in the form of a measuring roller and a device as described above. In both cases, the cooling shell is positioned on the circumference of the roll or roller and mounted there in the bearing free to move in the radial direction. The benefits of these solutions correspond to the benefits mentioned above in relation to the claimed device.

According to one sample embodiment of the rolling stand, the pivot joint on which the device of the invention is hung swinging free, especially in a one-piece embodiment, is mounted via the positioning mechanism, such as a cross arm of the rolling stand, centrally to the roll width and not at the chocks of the roll being cooled, for example. This affords the benefit, on the one hand, that the weight of the roll layout needing to be changed in event of wear, i.e., the roll with the chocks, is not further increased by the cooling device mounted thereon. Furthermore, the proposed mounting site affords the benefit that no non-uniform loading is produced between the entry side and the exit side of the roll gap and therefore thanks to the uniform loading which is produced here neither are there any negative impacts on the roll bending.

Alternatively, the bearing may have two halves, which are secured to the chocks of the roll—with the drawbacks described in the last paragraph.

In the rolling stand and/or in the measurement device, the pivot joint on which the device of the invention is hung swinging free can be designed as a spherical joint. The spherical design affords the benefit that swivel axis of the cooling shell formed by the pivot joint at the driving and attendance side always remains parallel to the axis of the roll or the measuring roller, even when the measuring roller or the roll is skewed in the rolling stand. The cooling shell would then follow the roll or the measuring roller and the function of the cooling shell would always be assured even when the roll or the measuring roller is skewed.

The aforementioned problem is furthermore solved by the method as set forth in the claims. The benefits of this method also correspond to the aforementioned benefits in regard to the claimed device and the claimed rolling stand.

Further advantageous embodiments of the device according to the invention, the rolling stand according to the invention, the measurement device or the method according to the invention are subject matter of the dependent claims.

BRIEF DESCRIPTION OF THE DRAWINGS

There are 5 Figures enclosed with the specification, where.

DETAILED DESCRIPTION OF THE PREFERRED EMBODIMENTS

The invention shall now be described in detail in the form of sample embodiments, making reference to the mentioned figures. In all figures, identical technical elements are designated with the same reference numbers.

Figure 1:
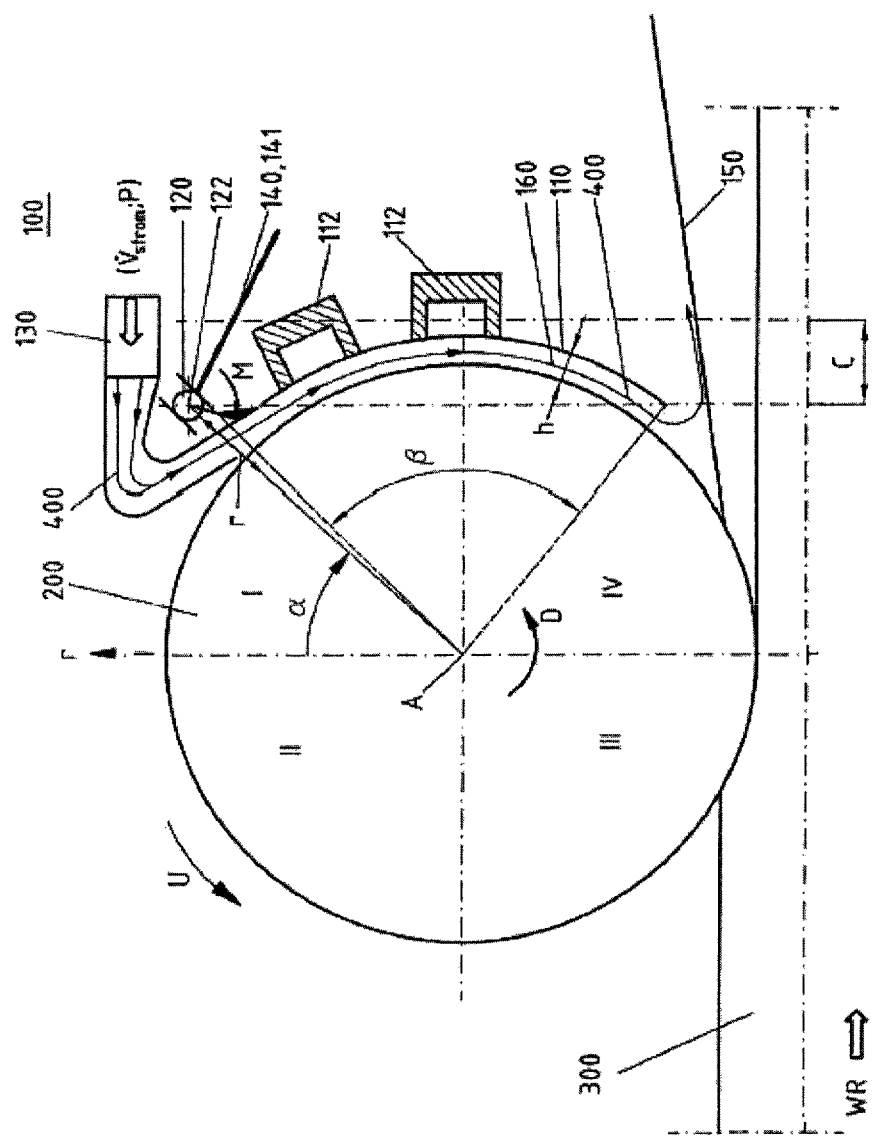
FIG. 1 is a cross section through the device according to the invention and the rolling stand according to the invention.

FIG. 1 shows a cross section through the rolling stand according to the invention. Of the rolling stand only one roll is seen in the form of a rolling roll 200 for the rolling of rolled product 300. The roll turns in the direction of rotation D. The roll is matched up on its right side with a device 100 according to the invention. Specifically, the device 100 comprises a cooling shell with a cross section in the shape of a circular arc section for the covering of a surface region of the roll 200. In the region of the upper edge of the cooling shell 110 there is arranged a bearing 120 with a pivot joint. The bearing is designed so that its axis of rotation 122 runs perpendicular to the circular cross section of the cooling shell 110 and parallel to the axis of rotation A of the roll 200. At this single pivot joint 120, the cooling shell 110 is hung free swinging. The single bearing with the pivot joint in which the cooling shell is rotationally mounted has a degree of freedom in the radial direction r with respect to the circular cross section of the cooling shell or with respect to the axis of rotation A of the roll 200, so that the cooling shell is mounted in the bearing 120 free to move in the radial direction r. Accordingly, the bearing is designed not only as a pivot joint, but also as a sliding bearing.

Figure 4:
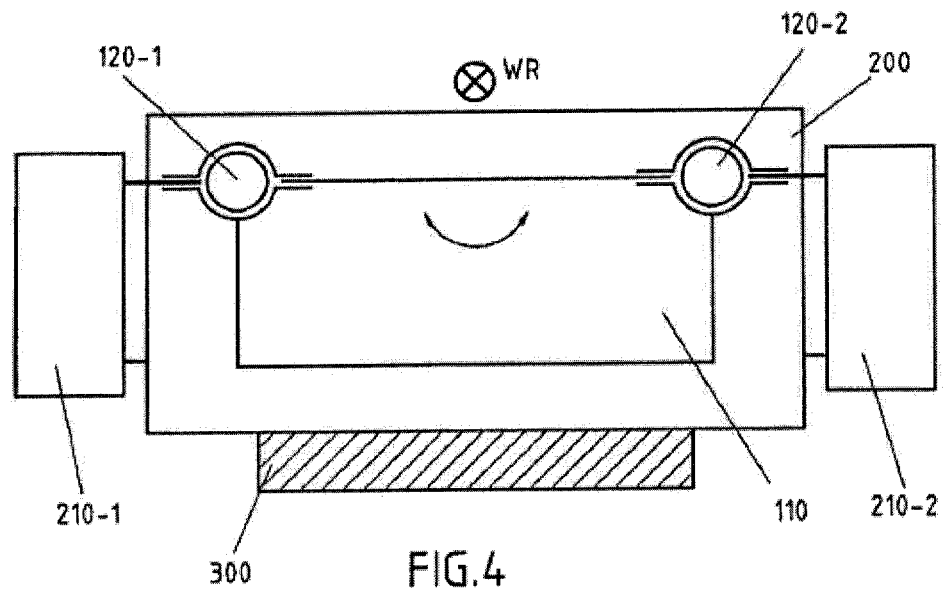
FIG. 4 is a first embodiment of the single bearing for the cooling shell.

FIG. 4 shows a first embodiment for the single bearing 120 of the cooling shell, wherein it consists of two half bearings 120-1, 120-2, each of them secured to one of the chocks, i.e., one of the bearing housings 210-1, 210-2 of the roll 200. While this has the drawback that the weight distribution over the center axis A of the complete roll 200 is not in equilibrium, nevertheless the roll according to the invention does not become stripped, since the half bearings need not transmit any bending moment, but only be able to adjust themselves freely.

Figure 5:
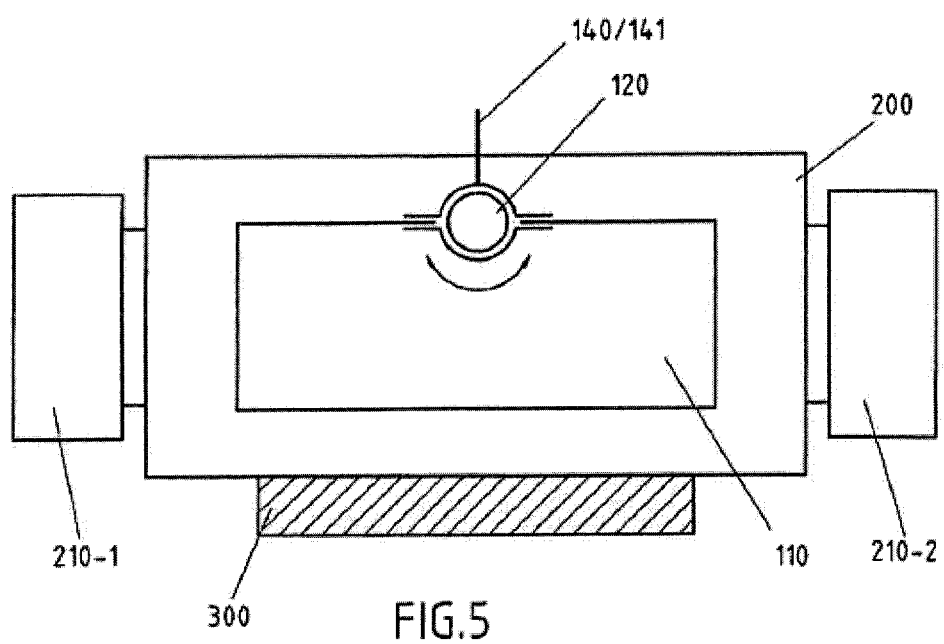
FIG. 5 is a second embodiment of the single bearing for the cooling shell.

FIG. 5 shows a second embodiment for the single bearing 120, where the bearing is arranged centrally on the cooling shell 110. The bearing is mounted or hung with the aid of a positioning mechanism 140, such as one in the form of an articulated arm or pivot arm 141, for example on a cross member of the rolling stand, centrally to the roll 200.

When the bearing 120 or the half bearings have a spherical design, the axis of rotation of the bearing or the cooling shell 110 in both embodiments can follow a skewing of the roll, so that in this case as well the axis of rotation of the cooling shell remains parallel with the axis of rotation of the roll. The swivel motion or deflection of the bearing required for this is indicated by an arc-shaped double arrow in FIGS. 4 and 5.

The bearing or the pivot joint in both embodiments can be positioned at any given angle position α on the circumference U of the roll.

Either on the upper edge of the cooling shell, as shown in FIG. 1, or on the lower edge of the cooling shell 110 there is provided a nozzle mechanism for the spraying of a cooling medium 400 into a cooling gap between the inside of the cooling shell 110 and the lateral surface of the roll 200. The side or edge of the cooling shell 110 at which the nozzle mechanism 130 supplies the cooling medium 400 to the cooling gap depends on the direction of rotation D of the roll and whether a counterflow cooling or a concurrent flow cooling is desired; in the latter case, the cooling medium 400 flows in the circumferential direction and direction of rotation D of the roll 200.

At the edge of the cooling shell opposite the supply of cooling medium, the shell preferably has no boundary of any kind, especially no collecting tank for the cooling medium, so that an unhindered force-free drainage of the cooling medium is assured there. This is advantageous for the free play of forces mentioned in the next paragraph.

The cooling medium 400 is forced by the nozzle mechanism 130 either with a given volume flow $V_{strom}$ or a given pressure P into the cooling gap. Thanks to the pivot joint 120 which is mounted freely movable in the radial direction, under a free play of forces the height h of the cooling gap 160 optimally adjusts itself automatically or spontaneously. Thanks to the free swinging suspension of the cooling shell in the pivot joint 120, the height h of the cooling gap automatically or spontaneously adjusts itself correctly not only at the height of the pivot joint, but also everywhere in the angle range β of the cooling shell. This makes unnecessary a manual or automatic setting of a fixed height h.

The adjusted height h of the cooling gap, as noted, is dependent on the free play of forces. Specifically, the gap height is influenced by the following physical quantities: the volume flow or the pressure of the cooling medium 400 in the cooling gap and the torque or the resulting area loading, which the cooling shell, optionally with ballast weights secured to it, exerts on the cooling medium during rolling operation when deflected about the axis of rotation 122 of the pivot joint 120. In mathematical terms, the following relation holds:

$$h = f[1/(m*g); 1/C; \dot{V}_{Strom}; P] \quad (1)$$

where we have:
h: gap height
f: functional relationship
m: overall weight of the cooling shell with ballast weights or corresponding weight distribution
g: gravitational constant
C: lever arm of the cooling shell when deflected from the pendulum position of rest
$V_{strom}$ volume flow of the cooling medium
P: pressure of the cooling medium The torque of the cooling shell 110 with the ballast weights 112 depends on the distribution of the ballast weights 112 on the convex outer circumference of the cooling shell 110 and their spacing from the convex outside of the cooling shell 110. The greater the ballast weights and the further away from the outside of the cooling shell 110 they are, the greater is the torque and thus also the force or the area load with which the cooling shell presses on the roll or the cooling medium 400 in the cooling gap; this relationship is shown graphically in FIG. 2. The broken lines symbolize the greater force or torque action with the loading weights 112 placed further on the outside as compared to ballast weights lying further on the inside (nonbroken lines).

Ideally the bearing 120 is designed as a sliding bearing with a pivot joint able to move freely therein in the radial direction for the free swinging suspension of the cooling shell. In this ideal type of bearing system, the positioning of the bearing in a definite angle position α on the periphery of the roll would be fixed.

In practice, it is generally sufficient for the positioning of the roll in the circumferential direction U to be only approximately constant; that is, slight fluctuations in the angle position are generally tolerable. Under this precondition, the bearing 120 can be realized such that the pivot joint is secured to the positioning mechanism 140, which can swivel in a plane transverse to the axis of rotation of the roll 200. Of the positioning mechanism, only a lever 141 is shown in FIG. 1, at the end of which the pivot joint 120 is arranged, and whose other end is mounted, e.g., at a fixed pivot point. The positioning mechanism 140 so designed then constrains the pivot joint 120 in an orbit with at least one component in the radial direction of the roll 200. In this radial direction, the pivot joint must be freely movable at least during the rolling operation, if necessary also tolerating slight fluctuations in the angle position α. Accordingly, the swiveling positioning mechanism 140 in the described embodiment ensures the degree of freedom of the bearing 120 in the radial direction. The positioning mechanism 140 can have a drive unit, not shown in FIG. 1, for the positioning of the pivot joint in a starting position before and at the end of the cooling operation. This drive unit may be mechanical, electromechanical, pneumatic or hydraulic. The drive unit may be arranged either inside or outside the rolling stand. In the starting position, however—not later than the start of the rolling and cooling operation—the free radial mobility must be assured or allowed.

The curvature of the cooling shell 110 preferably corresponds to the curvature of the roll 200, so that the center axis of the curved cooling shell 110 preferably coincides with the axis of rotation of the roll 200, as shown in FIG. 1 by the broken lines and the angle β.

Furthermore, a stripper 150 is arranged in FIG. 1 between the lower end of the cooling shell 110 and the rolling product 300. This stripper 150 protects the structural parts above it, i.e., in particular the cooling device 100 according to the invention, against influences from the rolled product 300. Furthermore, the stripper ensures that the rolled product 300 is diverted from the roll 200 and moved further in the rolling direction WR.

Alternatively to the design of the roll as a roller in a rolling stand, the roll can also be designed as a measuring roller, on whose surface surfaces are then arranged, typically pressure sensors. Such a measuring roller can be mounted for example in a roller conveyor behind a rolling train. During the operation, the measuring roller may be partly wrapped around with hot rolled product, so that the sensors might be heated too intensely. The device according to the invention can then be positioned on the circumference of the measuring roller for a cooling of the sensors. In this way, a temperature range can be established on the sensors which does not harm the sensors.

Figure 2:
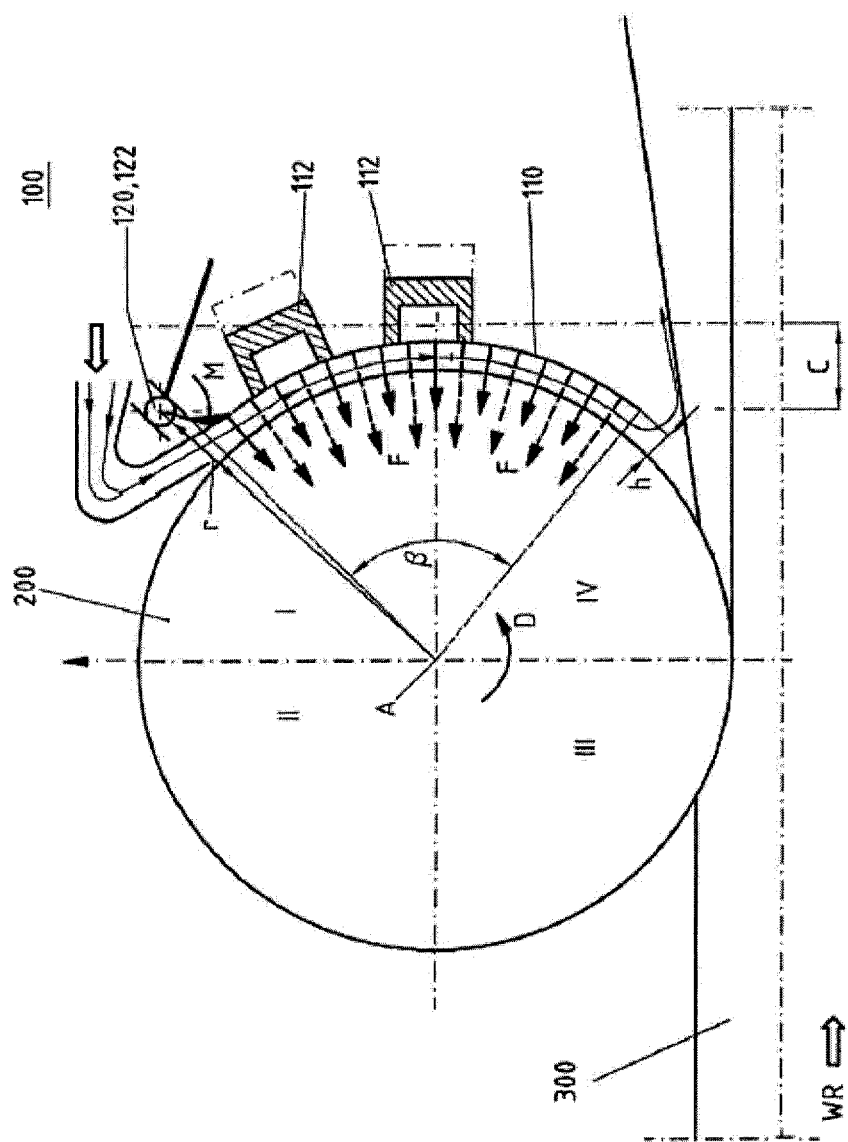
FIG. 2 is a supplement to FIG. 1.

The cooling device according to the invention for the cooling of a roll in a rolling stand or for the cooling of a measuring roller works as follows:

During the rolling operation or the operation of the measuring roller, the cooling medium 400 is supplied by means of the nozzle mechanism 130 with a predetermined pressure P or a predetermined volume flow Vstrom, as shown in FIG. 1, to the cooling gap 160. Thanks to the mounting of the cooling shell 110 on the pivot joint 120 with free mobility in the radial direction r, the height h of the cooling gap is then optimally established not only in the region of the pivot joint 120, but also over the entire angle range 13 of the cooling shell 110. Optimal means according to the free play of forces and torques. Particularly involved in this free play of forces is the force distribution in the angle range E, acting from the cooling shell 110 on the cooling medium in the cooling gap, as shown in FIG. 2. The magnitude of this force distribution, as noted, is dependent on the weight distribution of the cooling shell itself and—if present—the size of the ballast weights 112, their distribution at the outer circumference of the cooling shell 110 and their distance from the outside of the cooling shell. The magnitude of the resulting torque also depends on the angle position α of the axis of rotation of the pivot joint 120 at the circumference of the roll, since this determines the size of the lever arm C, which influences the distance between the centroid line of the cooling shell 110, which is hung free swinging from the pivot joint 120 (left dash-and-dot line in FIGS. 1 and 2) and under deflection of the loaded cooling shell due to the roll 200 and the cooling medium 400 in the cooling gap; see right dash-and-dot line in FIGS. 1 and 2. The size of the lever arm C is substantially influenced by the position of the pivot joint 120 on the circumference of the roll 200.

The mentioned radial forces on account of the torque of the cooling shell 110 act at the center point or at the axis of rotation of the roller or roll 200. Likewise, the cooling shell 110 is also pulled by the cooling medium 400 flowing in the cooling gap 160 toward the axis of rotation of the roller or roll, because a partial vacuum prevails in the cooling gap on account of the flowing medium 400. The two mentioned force distributions pointing toward the axis of rotation of the roller or roll are compensated entirely by a reaction force distribution, which is produced by the cooling medium in the cooling gap, because the cooling medium in the cooling gap essentially cannot be compressed and this must be taken into account by the volume flow or pressure of the cooling medium dictated by the nozzle mechanism 130. Accordingly, the radial reaction force distribution prevents the height of the cooling gap from becoming zero.

The cooling shell 110 because of the optionally and variably positionable ballast weights possesses an adjustable characteristic in regard to its weight distribution and thus the torque exerted by it. Specifically, the ballast weights 112 are variable in their size and can be positioned freely in their distribution at the convex outside of the cooling shell. The arc dimension 11 can also be chosen suitably. The interplay of the cooling shell's weight distribution characteristic and the volume flow or pressure of the cooling medium 400 dictated by the nozzle device 130 automatically yield a particular size h of the cooling gap 160. The interplay of the described parameters means that the cooling shell 110 thanks to the resulting pressure relations in the cooling gap 160 with its flow of cooling medium brings about a clinging of the cooling shell to the cooling medium 400 or to the roll 200. It becomes clear from equation 1 that the height h of the cooling gap can be influenced by variation of the weight distribution of the ballast weights 112 and the angle position α. Specifically, larger ballast weights and larger torques bring about a higher area load, which must ultimately be borne by the flow of the cooling medium 400 in the cooling gap 160. The volume flow $V_{strom}$, or the pressure P of the cooling medium 400 of the nozzle mechanism 130 in process variables should provide to the cooling process predetermined limits of a higher-level control system of the rolling process.

Specifically, the desired thermal power, represented by the so-called heat transfer coefficient a, is dependent on the height h of the cooling gap 160 and the volume flow of the cooling medium 400 in the cooling gap 160.

For a given desired cooling power or given heat transfer coefficient a and for pressure or volume flow of the cooling medium furthermore dictated by the nozzle mechanism 130, the required torque of the cooling shell 110 about the axis of rotation 122 can be calculated. Specifically, one then gets the necessary torque as an integral of the pressure distribution of the cooling medium 400 in the cooling gap 160 multiplied by the area of the cooling shell 110 and integrated over the distance to the point of suspension, i.e., to the axis of rotation 122 of the bearing 120.

The cooling device proposed by the invention offers the advantage that the height h of the cooling gap 160 in the radial direction is optimally established spontaneously and the cooling shell floats on the roller or roll or clings to the roll by virtue of the flow and pressure relations of the cooling medium 400 in the cooling gap. The cooling device operated in this way produces a uniform cooling in the circumferential direction and over the breadth of the roll.

Figure 3:
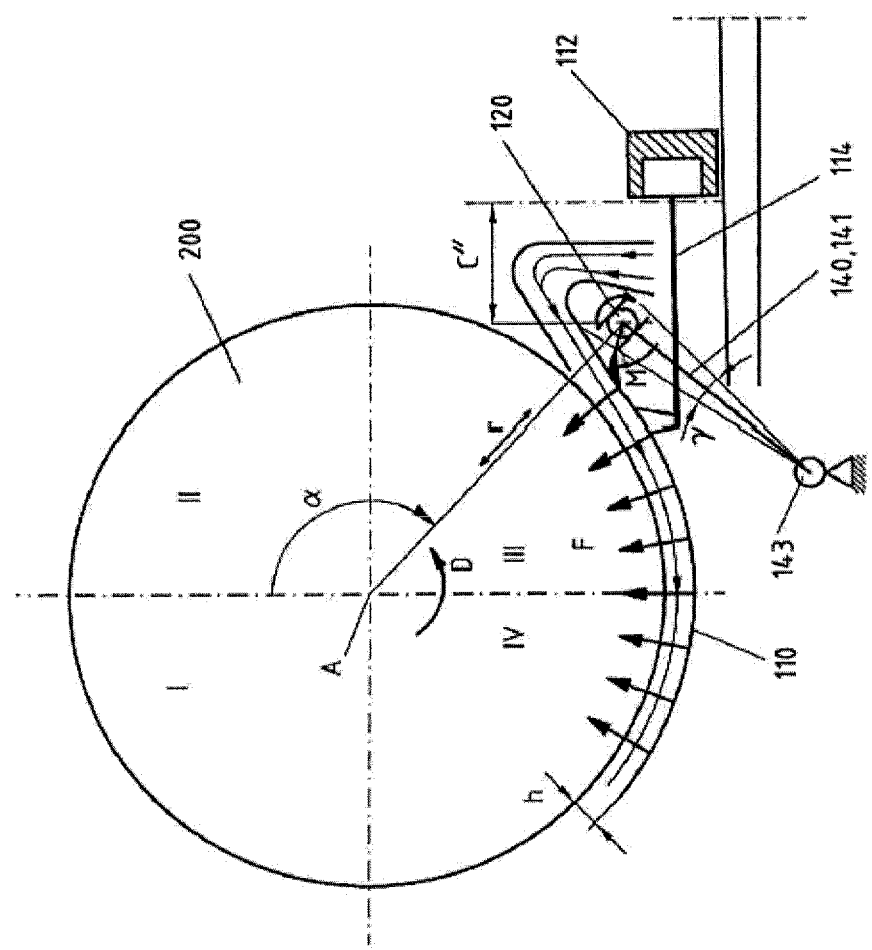
FIG. 3 is another sample embodiment for the placement of the cooling shell according to the invention on the circumference of a roll.

FIG. 3 shows another sample embodiment for the positioning of the cooling device 100 according to the invention on the circumference of the roll 200.

Specifically, FIG. 3 shows a sample embodiment of the device 100 according to the invention in which the cooling shell is arranged on the underside of the roll 200 for the cooling of the roll in the region of the quadrants III and IV. Here as well, the pivot bearing 120 is secured to a positioning mechanism 140, which comprises substantially a lever arm 141, which is mounted to swivel about a pivot point 143. The positioning mechanism 140 is designed such that a swiveling of the pivot arm 114 is permitted at least in an angle range γ, making possible a free mobility of the pivot joint 120 in the radial direction r.

In this sample embodiment as well, the cooling shell 110 is hung free swinging from the pivot bearing 120; however, the ballast weight 112 in the present case is arranged via the lever arm 114 in relation to the axis of rotation 122 of the pivot joint 120 such that the cooling shell 110 on the whole presses with an area load F or a torque M against the underside of the roll 200 and does not fall for example in a centroid line in the direction of the force of gravity, i.e., the pendulum position of rest.

LIST OF REFERENCE NUMBERS

100 Device
110 Cooling shell
112 Ballast weight
114 Lever arm
120 Bearing, especially pivot joint
120-1 Half bearing
120-2 Half bearing
122 Axis of rotation
130 Nozzle mechanism
140 Positioning mechanism
141 Pivot arm
143 Pivot point
150 Stripper
160 Cooling gap
200 Roll, especially a roller
210-1 Chock
210-2 Chock
300 Rolled product, metal strip
400 Cooling medium
h Size/height of the cooling gap
r Radial direction
D Direction of rotation
F Area load
M Torque
U Circumferential direction
A Axis of rotation of the roll
C Lever arm
$V_{strom}$ Volume flow of the cooling medium
P Pressure of the cooling medium
a Heat transfer coefficient
α Angle position
β Angle range of the cooling shell
WR Rolling direction
I, II, III, IV Quadrants of the roll cross section

The invention claimed is:

1. A device for cooling a roll comprising a cooling shell formed as a circular section for covering a surface region of the roll, and a bearing located in an edge region of the circular section and formed as a pivot joint provided with a rotational axis extending perpendicular to the cooling shell for pivoting the cooling shell about the rotational axis; and
wherein the bearing has a degree of freedom in a radial direction (r) with respect to the cooling shell, and the cooling shell is supported on the bearing to provide uniform displacement of the cooling shell relative to the roll in the radial direction.

2. The device according to claim 1, wherein a ballast weight is mounted on a convexly curved circumference outside of the cooling shell at a distance from an outer surface of the cooling shell, and in that a lever arm is provided for mounting the ballast weight outside of the cooling shell.

3. The device according to claim 2, wherein the lever arm and the ballast weight are designed and arranged so that a desired torque about the axis of rotation of the bearing is adjusted in concert with weight distribution of the cooling shell for a predetermined deflection of a combination of the cooling shell and the ballast weight from a pendulum position of rest.

4. The device according to claim 1, wherein the cooling shell is hung freely swinging from the bearing.

5. The device according to claim 1, further comprising a nozzle mechanism for spraying a cooling medium with a predetermined pressure or volume flow tangentially to a concavely curved inside surface of the cooling shell.

6. The device according to claim 1, further comprising a positioning mechanism, which engages with the bearing for positioning the bearing together with the radially movable cooling shell supported thereon in a predetermined angular position (α).

7. The device according to claim 1, wherein the bearing is a spherical bearing.

8. A rolling stand comprising: a roll; and a device for cooling the roll, wherein the device for cooling the roll includes a cooling shell formed as a circular section for covering a surface region of the roll, and a bearing located in an edge region of the circular section and formed as a pivot joint provided with a rotational axis extending perpendicular to the cooling shell for pivoting the cooling shell about the rotational axis,
wherein the bearing has a degree of freedom in a radial direction (r) with respect to the cooling shell, and the cooling shell is positioned on an outer circumference of the roll and is supported on the bearing to provide uniform displacement of the cooling shell relative to the roll in the radial direction (r).

9. The rolling stand according to claim 8, wherein the device is supported by the bearing for free swinging displacement over the outer circumference of the roll.

10. The rolling stand according to claim 8, further comprising a positioning mechanism for mounting the device at an angle (a) with respect to the rotational axis in a circumferential direction (U).

11. The rolling stand according to claim 8, wherein the bearing, together with the device for cooling freely suspended therefrom, is mounted on the rolling stand.

12. The rolling stand according to claim 8, wherein the bearing, together with the cooling device freely suspended therefrom, is formed of two halves mounted on roll chocks.

13. A measurement device, comprising a measuring roller in form of a roll on a surface of which a plurality of sensors for detecting pressure or flatness distribution in a width direction of a rolled product which is partially wrapped around the roll; and a device for cooling the roll, wherein the device for cooling the roll includes a cooling shell formed as a circular section for covering a surface region of the roll, and a bearing located in an edge region of the circular section and formed as a pivot joint provided with a rotational axis extending perpendicular to the cooling shell for pivoting the cooling shell about the rotational axis,
    wherein the bearing has a degree of freedom in a radial direction (r) with respect to the cooling shell, and the cooling shell is positioned on an outer circumference of the roll and is supported on the bearing to provide uniform displacement of the cooling shell relative to the roll in the radial direction.

14. The measurement device according to claim 13, wherein the device is supported by the bearing for free swinging displacement over the outer circumference of the roll.

15. The measurement device according to claim 13, further comprising a positioning mechanism for mounting the device at an angle ($\alpha$) with respect to the rotational axis in a circumferential direction (U).

16. The measurement device according to claim 13, wherein the bearing, together with the cooling device freely suspended therefrom, is formed of two halves mounted on roll chocks.

17. A method of operating a rolling stand, the rolling stand includes a roll for rolling a rolled product and a cooling device for cooling the roll, wherein the cooling device includes a cooling shell which is formed as a circular section for covering a surface region of the roll, the cooling device further including a bearing located in an edge region of the circular section and formed as a pivot joint provided with a rotational axis extending perpendicular to the cooling shell for pivoting the cooling shell about the rotational axis,
    wherein the bearing has a degree of freedom in a radial direction (r) with respect to the cooling shell, and the cooling shell is positioned on an outer circumference of the roll and is supported on the bearing to provide uniform displacement of the cooling shell relative to the roll in the radial direction (r),
    the method comprising the steps of:
    positioning the cooling device at an angle (a) about a portion of the outer circumference of the roll at a predetermined radial spacing from the roll;
    spraying a cooling medium from the cooling device with a predetermined pressure and/or volume flow into a cooling gap formed between an outer surface of the roll and a concavely curved internal surface of the cooling shell;
    rolling the rolled product during the spraying of the cooling medium; and
    releasing the cooling device in the radial direction (r) so that the cooling gap is suitably adjusted in a region of the pivot joint based on a free mobility of the cooling shell in the radial direction which is in response to a magnitude of the pressure and/or the volume flow of the cooling medium sprayed into the cooling gap.

18. Method according to claim 17, wherein the cooling gap is adjusted along an entire length of the cooling shell upon detection of an equilibrium of forces between a radially inwardly acting distribution of a pendulum force of the cooling shell, a radially inwardly acting distribution of a suction force of a flow of the cooling medium in the cooling gap, and distribution of a force of reaction of the cooling medium.

19. A method of operating a measurement device, the measurement device comprising a measuring roll with a surface having a plurality of sensors for detecting pressure or flatness distribution in a width direction of a rolled product which is partially wrapped around the roll; and
    a cooling device for cooling the roll and having a cooling shell formed as a circular section for covering a surface region of the roll, the cooling device further including a bearing located in an edge region of the circular section and formed as a pivot joint provided with a rotational axis extending perpendicular to the cooling shell for pivoting the cooling shell about the rotational axis,
    wherein the bearing has a degree of freedom in a radial direction (r) with respect to the cooling shell, and the cooling shell is positioned on an outer circumference of the roll and is supported on the bearing to provide uniform displacement of the cooling shell relative to the roll in the radial direction, the method comprising the steps of:
    positioning the cooling device at an angle (a) about a portion of the outer circumference of the roll at a predetermined radial spacing from the roll;
    spraying a cooling medium from the cooling device with a predetermined pressure and/or volume flow into a cooling gap formed between an outer surface of the roll and a concavely curved internal surface of the cooling shell;
    turning of the roll for transporting the rolled product during operation of the measuring roll, and during the spraying of the cooling medium, releasing the cooling device in the radial direction (r) so that the cooling gap is suitably adjusted in a region of the pivot joint based on a free mobility of the cooling shell in the radial direction which is in response to a magnitude of the pressure and/or the volume flow of the cooling medium sprayed into the cooling gap.

\* \* \* \* \*